UNITED STATES PATENT OFFICE.

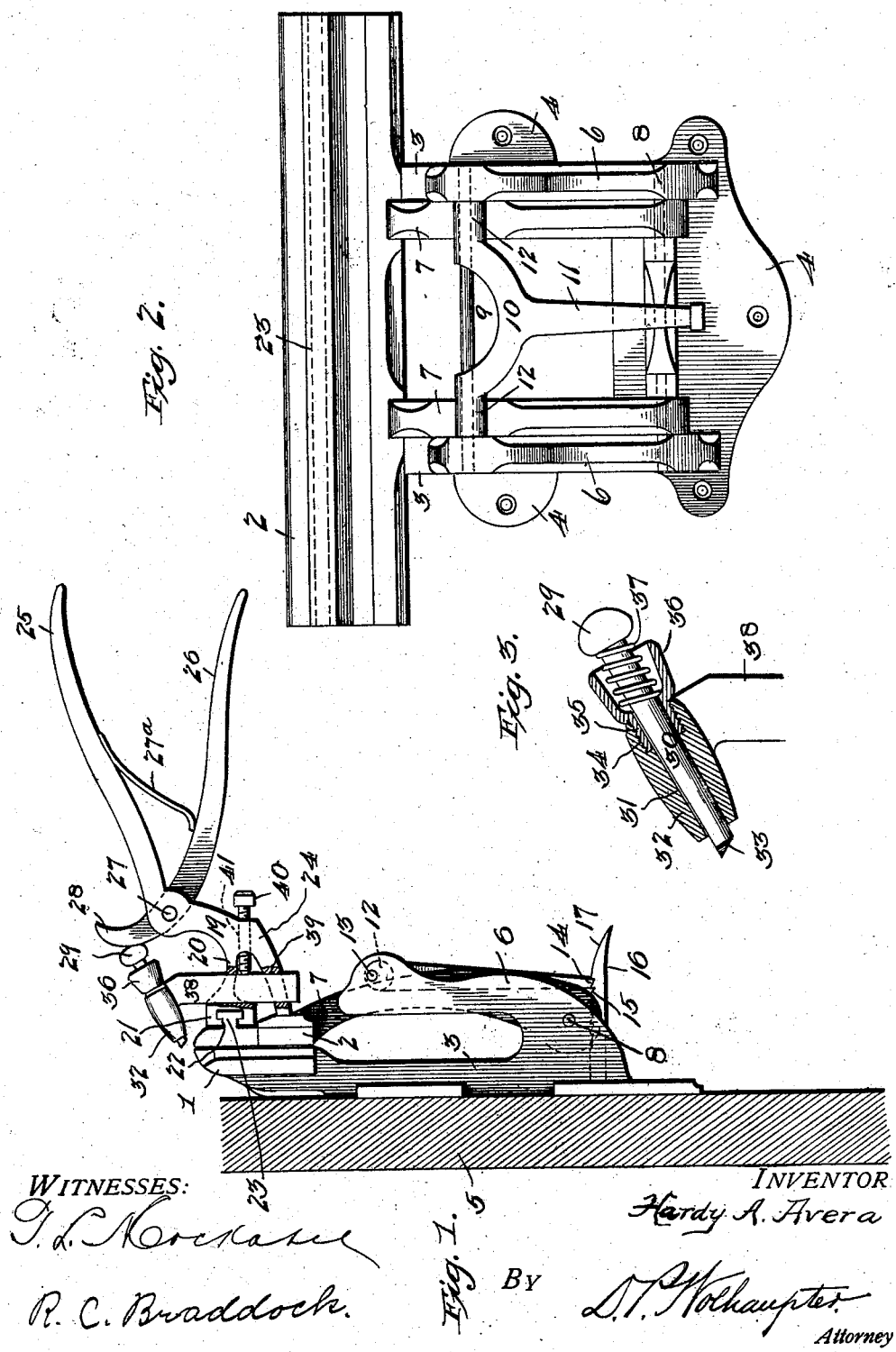

HARDY ALEXANDER AVERA, OF HEMET, CALIFORNIA.

SAW-SETTING MACHINE.

No. 858,556.  Specification of Letters Patent.  Patented July 2, 1907.

Application filed February 23, 1906. Serial No. 302,452.

*To all whom it may concern:*

Be it known that I, HARDY ALEXANDER AVERA, a citizen of the United States, residing at Hemet, in the county of Riverside and State of California, have invented certain new and useful Improvements in Saw-Setting Machines, of which the following is a specification.

This invention relates to that type of metal working tools and implements designed for setting and sharpening saws, and has special reference to a simple and practical construction of saw setting machines embodying means for properly and securely holding a saw blade in such relation to a setting tool that the teeth of the saw may be quickly and accurately set to the degree desired.

To this end the invention contemplates improved means for clamping a saw blade in a position for being operated upon and also improved means for accurately securing any degree of set for saw blades having teeth of any size, thereby adapting the machine to the fullest possible range of adaptability necessary for operating upon saws having coarse or fine teeth.

Another object of the invention is to provide a saw setting machine wherein the setting tool is not only shiftable longitudinally of the clamping vise for the saw blade, but also capable of ready removal therefrom to permit the remainder of the machine, or clamping vise, to be readily utilized for saw sharpening purposes.

With these and other objects in view, which will more readily appear as the nature of the invention is better understood, the same consists in the novel construction, combination and arrangements of parts hereinafter more fully described, illustrated and claimed.

The essential features of the invention involved in the construction of the clamping vise and of the tool carriage and its related parts, are necessarily susceptible to structural change without departing from the scope of the invention, but a preferred construction is shown in the accompanying drawings, in which:

Figure 1 is an end elevation of a complete saw setting machine embodying the present invention. Fig. 2 is a front elevation of the clamping vise with the tool carriage removed. Fig. 3 is an enlarged detailed sectional view of the obliquely arranged tool holder and the stroke regulating cap carried thereby for determining the stroke of the setting punch or plunger.

Like references designate corresponding parts in the several figures of the drawings.

The machine embodies in its general organization a supporting and clamping means for the saw blade to be operated upon, and also a tool carriage operatively related to the frame and carrying a punch or plunger for deflecting the saw teeth to the proper degree of set.

Referring in the first place to the saw clamping means, the construction employed for this part of the invention provides what may be properly termed a saw clamping vise which includes a pair of elongated parallel gripping jaws 1 and 2 respectively, between which jaws the saw blade is inserted and gripped. The said jaws 1 and 2 are relatively movable, and for convenience of description the jaw 1 may be referred to as the fixed gripping jaw and the jaw 2 as the movable gripping jaw, which has movement toward and from the fixed jaw for clamping and releasing purposes.

The fixed gripping jaw 1 is carried at the upper ends of a pair of oppositely arranged upright side supporting frames 3 which are rigidly formed with an attaching base 4 secured to a work bench 5 or other point of support for the clamping vise. In the preferable construction of the latter the side supporting frames 3 are provided with forwardly projected hanger arms 6 between which are arranged to work the opposite parallel side arms 7 carrying at their upper ends the movable gripping jaw 2, plainly shown in Figs. 1 and 2 of the drawings. The opposite side arms 7 constitute what may be properly termed a swinging carrier frame for the movable jaw of the vise, and the lower ends of the said side arms 7 are pivotally connected with the side supporting frames 3 at the lower ends of the front hanger arm 6 through the medium of pivot pins or bolts 8, thereby completing a very strong and substantial support for both the fixed and movable jaws of the vise.

To provide for closing the movable jaw 2 against the saw blade between the two jaws, there is preferably employed a pressure-closing device designated in its entirety by the numeral 9 and essentially consisting of an approximately T-shaped head 10 provided with a central lever arm or handle 11 and the oppositely disposed roller cam elements 12 eccentrically pivoted between the upper ends of the front hanger arms 6 through the medium of eccentric journal pins 13 mounted in the hanger arms 6 and also in the cam elements 12. (See Figs. 1 and 2 of the drawings.)

The lower end of the lever arm or handle 11 of the closing device is pointed and beveled to form an engaging dog 14 adjustably engaging the ratchet teeth 15 of a spring catch rack 16 projected upwardly and forwardly from the lower portion of the attaching base 4 and having a beveled nose 17 over which the point or dog 14 freely rides in the closing operation.

The construction of closing device described provides means for placing an even pressure upon the carrier frame for the movable jaw, while at the same time providing a strong and powerful clamp for the vise.

The tool carriage is designated in its entirety by the reference number 18 and essentially consists of a main bracket piece 19 having an inwardly projecting carrying arm 20 which is provided at its extremity with a shiftable slide box 21 having a T or equivalent slide groove 22 registering with a correspondingly shaped supporting guide 23 projected integrally from the outer side of the movable jaw 2 and preferably in the form of a rib or rail running longitudinally thereof.

In addition to the arm 20, the bracket piece 19 is provided below the plane of said arm with a pendent brace arm 24 resting against the outer side of the movable jaw below the box 21 and at the upper end of the bracket piece the same is formed with an extended fixed handle member 25 arranged in opposition to a movable operating handle 26 normally held open by a release spring 27 on the handle member 25, and pivoted to the inner end of the latter by the pivot joint 27. At one side of the pivot 27 the movable operating member 26 is provided with a curved bearing cam 28 adapted to ride against the contact head 29 formed at one end of a reciprocatory setting punch or plunger 30. This setting punch or plunger 30 is guided for movement through the longitudinal bore 31 of a tool holder boxing 32, and the operating end 33 of the punch or plunger 30 is preferably triangular in cross section and inclined with respect to the clamping faces in order to permit the proper pressure on the saw teeth. At one end the tool holder boxing 32 is provided with a threaded socket 34 adjustably receiving a threaded shank 35 of a hollow stroke regulating cap 36 accommodating therein a retracting spring 37 bearing beneath the head 29 of the setting punch or plunger.

The tool holder 32 is set obliquely and is carried at the upper end of a tool supporting bar 38 vertically adjustable in guide openings 39 in members of the bracket piece and held fast in properly adjusted position for coarse or fine toothed saws through the medium of a set screw 40 mounted in the threaded opening 41 and the bracket piece 19 and impinging against the tool supporting bar 38.

In use as a setting machine, it is simply necessary to shift the tool carriage longitudinally of the vise as the work progresses and to manipulate the operating handle 25 for thrusting the operating end of the punch or plunger against the saw teeth, and through adjustment of the stroke regulating cap 36 the operator can accurately regulate the set of the teeth.

Upon removal of the tool carriage the vise may be employed for saw sharpening purposes.

Various changes in the form, proportion and minor details of construction may be resorted to without departing from the spirit of the invention or sacrificing any of the advantages thereof.

I claim:

1. In a machine of the class described, a saw clamping vise, a shiftable tool carriage slidably mounted on the vise, a vertically adjustable tool support independently mounted on the carriage, an adjustable setting tool carried by said support, and an independently mounted handle member also supported upon the carriage and arranged to engage the setting tool.

2. In a machine of the class described, a saw clamping vise having a supporting guide, a shiftable tool carriage comprising a bracket piece engaging said guide, and an offstanding fixed handle member, a vertically adjustable tool support mounted on the bracket piece and provided at its upper end with a tool holder, a setting punch mounted in the tool holder, and a movable handle operating against said punch.

3. In a machine of the class described, a saw clamping vise having a supporting guide extending longitudinally of its movable jaw, a shiftable tool carriage comprising a bracket piece having a slide box slidably engaging said supporting guide, a pendent brace arm resting against the jaw of the vise below the guide and an offstanding fixed handle member, a vertically adjustable tool support mounted on the bracket piece and provided at its upper end with a tool holder, a spring retracted setting punch or plunger mounted in the tool holder, and a movable handle member mounted on the bracket piece and having a cam operating against the punch or plunger.

4. In a machine of the class described, saw holding means, a tool support having a hollow boxing provided with a threaded portion at one end, a sliding setting punch mounted in said boxing, an adjustable stroke regulating cap having a threaded shank engaging a threaded portion of the boxing, and a retracting spring arranged within said cap.

5. In a machine of the class described, a vise comprising a fixed frame carrying a fixed gripping jaw having a pair of offstanding front hanger arms, swinging carrier arms pivotally supported at their lower ends on and between said hanger arms, the carrier arms carrying at their upper ends a movable gripping jaw, a fixed catch rack projected outwardly from the base of the fixed frame between the hanger arms thereof, and a pressure closing device consisting of a T-lever provided with a head having oppositely arranged roller cam elements pivotally hung within the hanger arms and operating against the carrier arms, said lever being further provided with a pendent arm whose lower end forms a dog working over said rack.

In testimony whereof I have signed my name to this specification in the presence of two subscribing witnesses.

HARDY ALEXANDER AVERA.

Witnesses:
WM. BRADFORD,
H. S. DUKES.